UNITED STATES PATENT OFFICE.

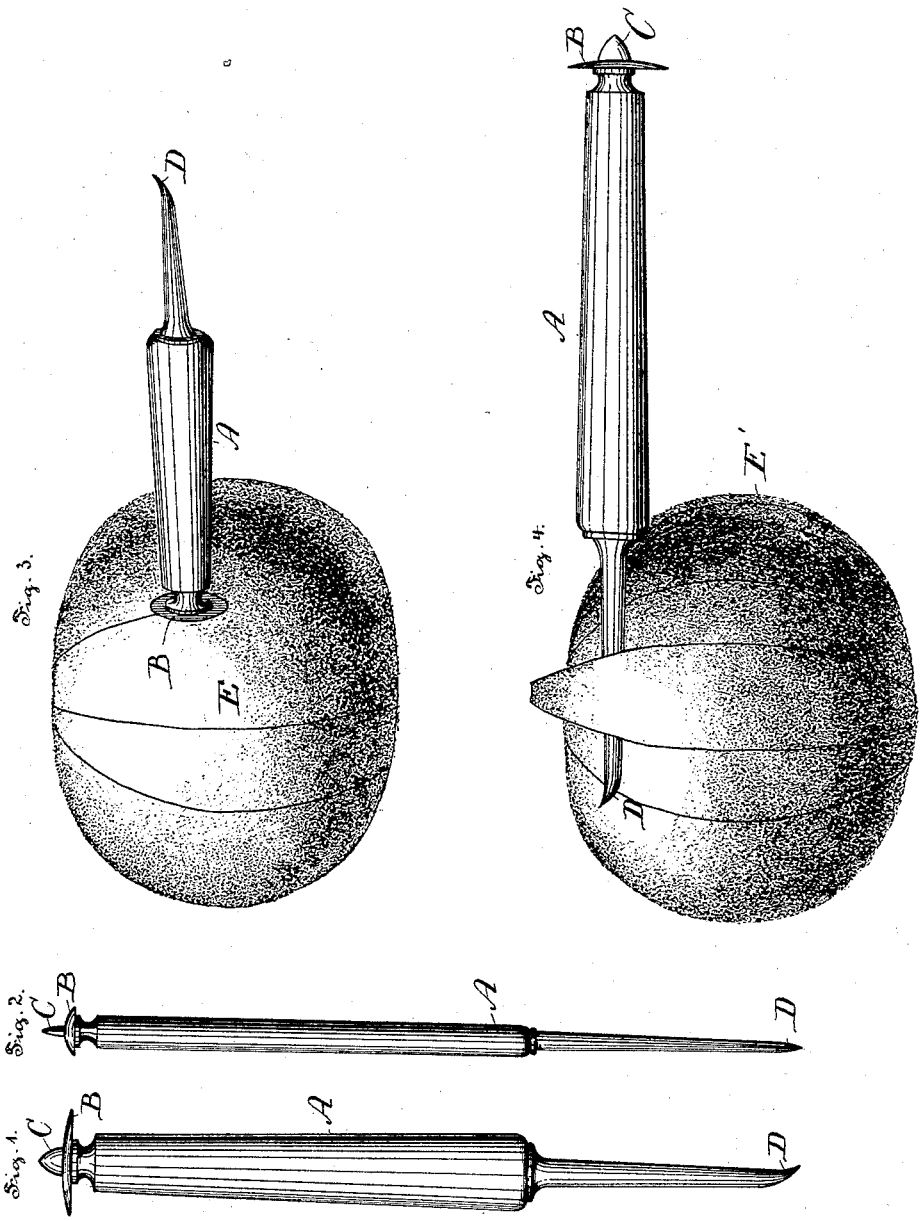

HARRY M. HAMRICK, OF PHILADELPHIA, PENNSYLVANIA.

COMBINED ORANGE-KNIFE AND NUT-PICK.

SPECIFICATION forming part of Letters Patent No. 461,914, dated October 27, 1891.

Application filed March 9, 1891. Serial No. 384,191. (No model.)

*To all whom it may concern:*

Be it known that I, HARRY M. HAMRICK, of the city and county of Philadelphia, State of Pennsylvania, have invented a new and Improved Combined Orange-Knife and Nut-Pick, of which the following is a specification, reference being had to the accompanying drawings, in which—

Figure 1 is a front elevation; Fig. 2, a side elevation on a reduced scale; Fig. 3, a view illustrating the manner of using the device in cutting the peel of an orange, and Fig. 4 a view illustrating the manner in which the device may be used in removing the peel of an orange after the same has been cut with the blade of the device.

Like letters in all the figures indicate similar parts.

The object of my invention is the production of a simple implement especially designed for cutting the peel of oranges, and adapted, also, for use as a nut-pick, and also to the removal of the peel from oranges after the same has been cut; and the invention consists, essentially, in providing a blade which preferably should have two cutting-edges with a shield or guard, so as to regulate the depth of the cut, and combining therewith at the opposite end of the handle of the implement a device alike adapted for use as a nut-pick, as also for insertion between the sections of the peel after they have been cut, so as to permit them to be readily removed from the orange. The guard or shield is preferably made convex upon its outer surface and so affixed upon one end of the handle relative to the blade as to regulate and confine the penetration and cut of the blade to the depth or thickness of the outer peel or skin of the orange.

A in the drawings is the handle; B, the guard; C, the knife; D, the nut-pick and peel-remover; E, an orange with the blade of the implement inserted therein in the act of cutting the peel, and E' the orange, showing the cut sections with the pick or peel-remover inserted, showing the manner of removing the peel. The nut-pick or peel-remover, as will be seen from the drawings, is preferably curved at its outer end, as it can thus be more easily inserted between the cut sections of the orange when used for that purpose, while at the same time it is thus better adapted for use as a nut-pick.

Having thus described my invention, I claim as new and desire to secure by Letters Patent—

1. In combination with the handle A, the guard B, formed convex on its outer face, the blade or knife C, attached to one end of the handle, and the nut-pick and peel-remover D, curved at its outer end and attached to the opposite end of the handle, substantially as herein shown and described.

2. In combination with the handle A, the blade or knife C, attached to one end thereof, and the intermediate guard B, formed convex on its outer face, substantially as herein shown and described.

In witness whereof I have hereunto affixed my signature in the presence of two subscribing witnesses.

HARRY M. HAMRICK.

Witnesses:
CHAS. C. COLLIER,
GEO. W. REED.